United States Patent [19]

McDonald

[11] 4,351,272

[45] Sep. 28, 1982

[54] ANTI-CRUSHING BAR ASSEMBLY FOR PIG FARROWING CRATES

[76] Inventor: Richard McDonald, General Delivery, Gunton, Manitoba, Canada, R0C 1H0

[21] Appl. No.: 244,005

[22] Filed: Mar. 16, 1981

[51] Int. Cl.³ .............................................. A01K 1/02
[52] U.S. Cl. ................................................... 119/20
[58] Field of Search ........................ 119/20, 16, 27, 22

[56] References Cited

U.S. PATENT DOCUMENTS 1,307,862 6/1919 James ..................................... 119/16
4,177,762 12/1979 Borcherding .......................... 119/20

FOREIGN PATENT DOCUMENTS 2126790 5/1973 Fed. Rep. of Germany ........ 119/20

*Primary Examiner*—Hugh R. Chamblee

*Attorney, Agent, or Firm*—Stanley G. Ade

[57] ABSTRACT

When a sow lies down in a conventional pig farrowing crate, piglets are often crushed as they are unable to move out of the way fast enough. This invention consists of an inwardly curved bar pivoted by the outer ends thereof between a pair of supports extending between the comfort bar and the bar immediately thereabove same. It normally is retained in a horizontal position by means of stops and these bars prevent the sow from lying down quickly as they interfere. With the bars in place, the sow has to maneuver as she lies down in order to get her back under one bar and the other underneath the other bar. This slows down the movement of the sow considerably thus enabling the piglets time to get out of the way. When the sow stands up, the bars pivot upwardly giving her sufficient room to stand whereupon they return by gravity to the original horizontal position.

6 Claims, 4 Drawing Figures

ANTI-CRUSHING BAR ASSEMBLY FOR PIG FARROWING CRATES

BACKGROUND OF THE INVENTION

This invention relates to new and useful improvements in pig farrowing crates.

The standard pig farrowing crate used to hold a sow while she is nursing her young, comprises a relatively narrow enclosure constructed of bars to form a pen-like enclosure.

A problem with such conventional crates is that when the sow lies down for nursing, the narrowness of the crate causes difficulty in standing up again. Also, when she lies down, the movement can be fairly rapid so that there is a possibility that she will roll on top of the piglets thereby crushing same as they do not have time to get out of the way.

In order to remedy these problems a "comfort bar" is utilized. This comprises the lowermost horizontal bar on the side of the crate being curved outwardly from the vertical plane of the crate side so as to allow the sow room to move at the bottom of the crate when nursing. However this modification, while allowing the sow more movement, results in more danger to the young as she tends to lie down more rapidly and furthermore she then has sufficient room so that she may roll on top of the piglets while nursing.

SUMMARY OF THE INVENTION

The present invention assists in overcoming these difficulties and in accordance with the invention there is provided in a farrowing crate which includes a horizontally situated lower comfort bar extending outwardly from the vertical side frame of the crate and further horizontal bar thereabove in spaced and parallel relationship with said comfort bar; an anti-crushing bar assembly, said anti-crushing bar assembly including support means secured to said crate and an inwardly extending anti-crushing bar pivotally secured by the ends thereof to said support means and means cooperating between said support means and said anti-crushing bar normally maintaining said anti-crushing bar substantially horizontally but allowing same to pivot upwardly from the horizontal position.

A further advantage of the present invention is to provide a pig farrowing crate which includes a horizontally situated lower comfort bar extending outwardly from each vertical side frame of said crate and a further horizontal bar in spaced and parallel relationship with each of said comfort bars, an anti-crushing bar assembly for each side of said crate, said anti-crushing bar assembly each including support means on said crate and an inwardly extending anti-crushing bar pivotally secured by the ends thereof to said support means and means cooperating between said support means and said anti-crushing bar normally maintaining said anti-crushing bar substantially horizontally but allowing same to pivot upwardly from the horizontal.

Yet another advantage of the invention is to provide a device which is readily attached to conventional pig farrowing crates, particularly those including comfort bars.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the difference figures.

DETAILED DESCRIPTION

Figure 1:
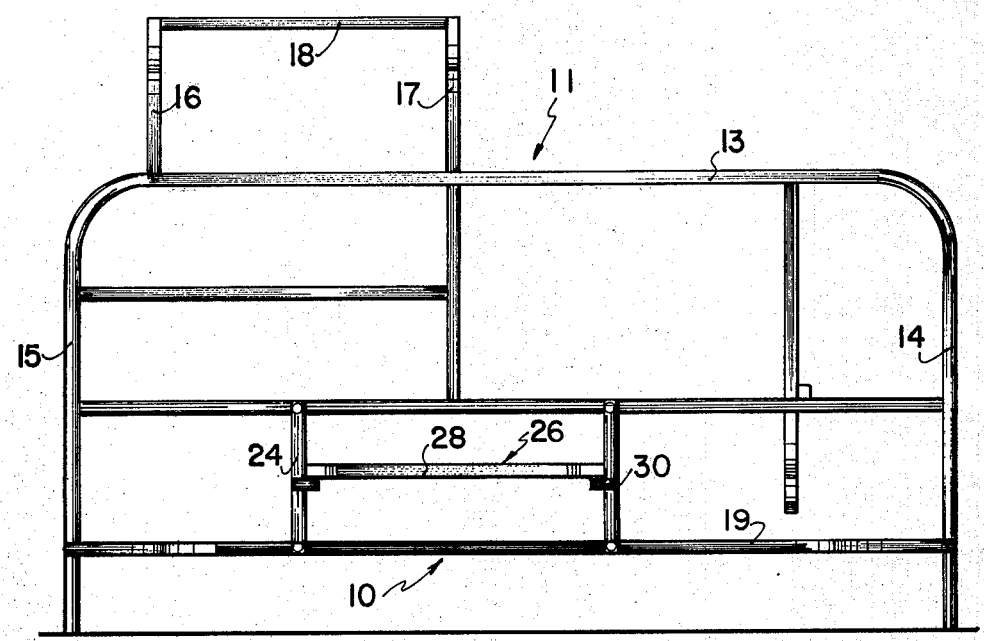
FIG. 1 is a side elevation of a pig farrowing crate with the invention incorporated therein.
Figure 2:
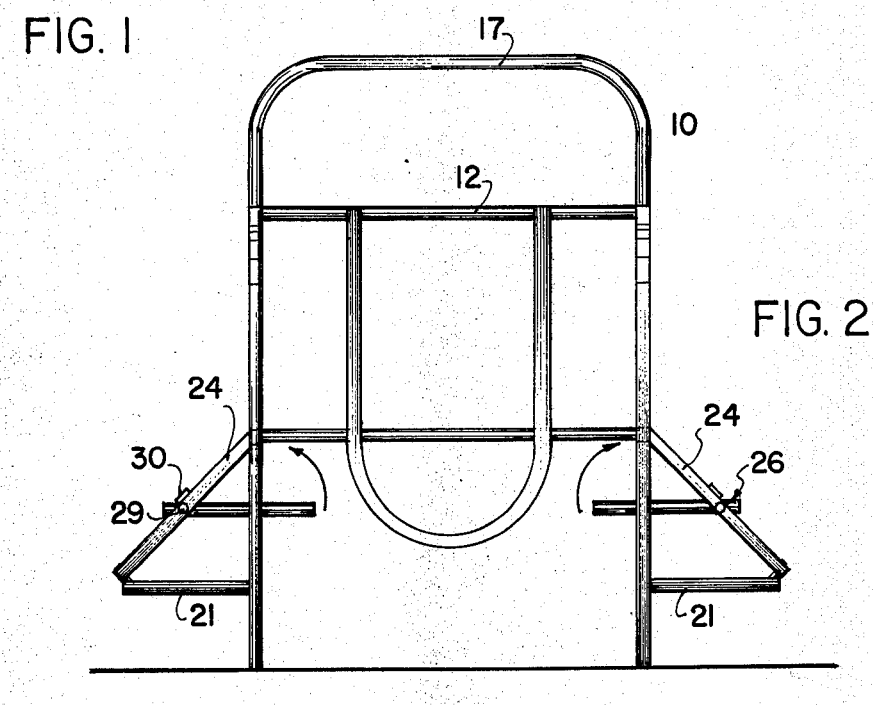
FIG. 2 is an end view of FIG. 1.

Proceeding therefore to describe the invention in detail, reference should first be made to FIGS. 1 and 2 which show a pig farrowing crate collectively designated 10 consisting of a pair of spaced and parallel side frame collectively designated 11 maintained in the desired spaced and parallel relationship by means of one or more cross bars 12, one of which only is shown in the drawings.

Each side frame, in this embodiment, includes a substantially horizontal upper member 13 having a downwardly curving one end member 14 at one end thereof and a downwardly curved other end member 15 at the other end thereof. U-shaped members 16 and 17 extend upwardly and over between the two side frames, and horizontal members 18 extend between the upper sides of the U-shaped members 16 and 17 all of which structure is conventional. In the majority of farrowing crates, the aforementioned comfort bars 19 are provided. These are substantially horizontally situated and extend between adjacent the lower ends of the end portions 14 and 15 of the side frames, being substantially U-shaped when viewed in plan and having a main horizontal portion 20 extending between the inturned ends 21 with the main portion 20 extending outwardly from the vertical plane of the side frames as clearly shown in FIGS. 2 and 3.

Figure 3:
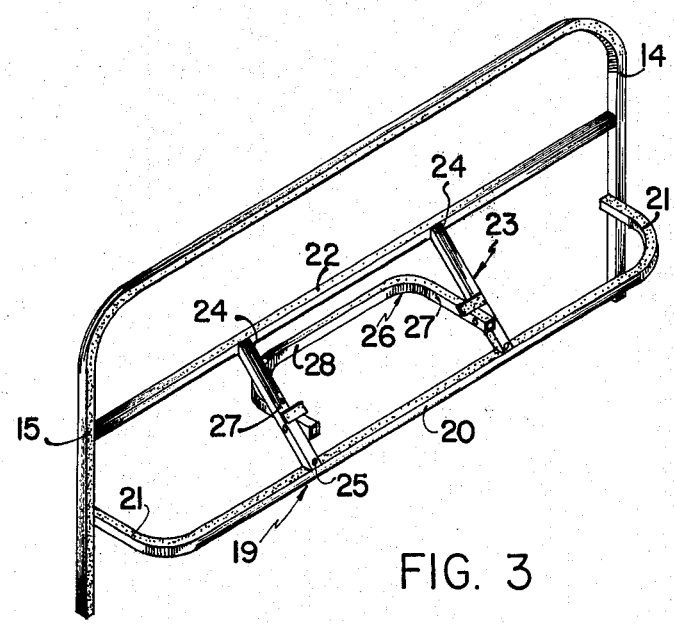
FIG. 3 is a fragmentary isometric view of one side of a farrowing crate with the invention installed therein.
Figure 4:
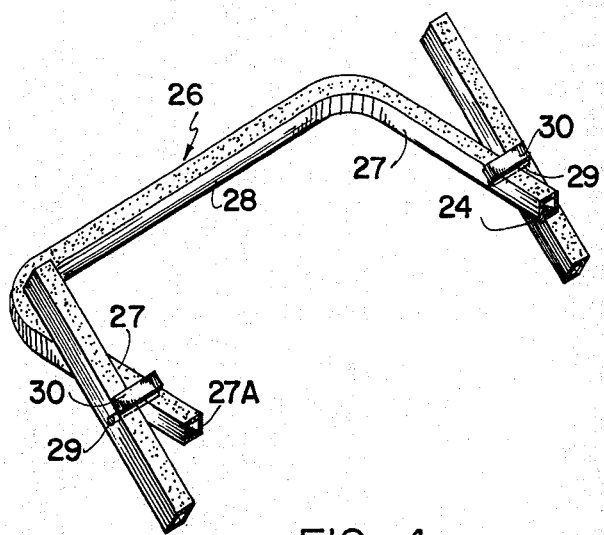
FIG. 4 is an isometric view of the anti-crushing bar assembly per se.

A further horizontal member 22 extends between the ends 14 and 15 of the side frames spaced above the comfort bar but substantially in alignment with the vertical plane of the side frames once again as clearly shown in FIG. 3.

The anti-crushing bar assembly collectively designated 23 is situated between the comfort bar 19 and the horizontal bar 22 thereabove and it is desirable but not essential that such an assembly is situated on both side frames of the farrowing crate as shown in FIG. 2.

Each crushing bar assembly includes support means comprising a pair of spaced and parallel bars 24 bolted or otherwise secured in spaced and parallel relationship, to the portion 20 of the comfort bar and to the bar 22 thereabove so that the support bars 24 incline upwardly and inwardly from the portion 20 of the comfort bar to the bar 22. This securement may be by means of nut and bolt assemblies 25, by welding, or any other conventional method and it will be observed that these support bars 24 are substantially perpendicular to the portion 20 and the bar 22 thereabove.

An anti-crushing bar collectively designated 26 is provided and is substantially U-shaped when viewed in plane. It includes a pair of end ortions 27 forming the legs of the U-shaped portion, with a main portion 28 extending therebetween and it is desirable that this anti-crushing bar be formed in one piece with the junctions between the end portions 27 and the portion 28, being curved as illustrated.

Pivot pins 29 are secured to the end portions 27 of the anti-crushing bar adjacent the ends 27A of the end portions, said pivot pins extending outwardly therefrom and engaging the support bars 24 thus mounting the anti-crushing bar 26 for pivotal movement relative to the support bars 24 with the anti-crushing bar extending inwardly as clearly shown preferably one upon each side frame of the crate.

Means are provided normally to maintain the anti-crushing bar in a substantially horizontal position shown in FIG. 2, under normal circumstances and one method comprises a stop plate 30 welded or otherwise secured to the support bars 24 and extending inwardly therefrom so that the ends of the end portions 27 of the anti-crushing bar 26, engage these stops when the anti-crushing bar is horizontal as clearly shown. However these stops permit the anti-crushing bar to moved upwardly to a position substantially parallel to the support bars 24, which, as hereinbefore described, incline upwardly and inwardly.

In operation, in order for the sow to lie down, she must lie straight down on her stomach and then roll on her side slowly as one bar lifts over her back and the other moves out of the way of her udder.

Because of this slow movement, the sow does not fall quickly onto her side thereby permitting piglets to move out of the way before being crushed.

Once the sow is in the lying down or nursing position, she will have no difficulty in standing up since the anti-crushing bars will pivot upwardly when pushed from underneath so that they can lie substantially parallel with the supports.

Once the sow is standing, the anti-crushing bars will fall back to the horizontal position by means of gravity, being retained in this horizontal position by means of the aforementioned stops 30.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a pig farrowing crate which includes a horizontally situated lower comfort bar extending outwardly from the vertical side frame of the crate and a further horizontal bar thereabove in spaced and parallel relationship with said comfort bar but spaced inwardly therefrom and in the plane of said vertical side frame; an anti-crushing bar assembly, said anti-crushing bar assembly including support means secured to said crate and an inwardly extending anti-crushing bar pivotally secured by the ends thereof to said support means said support means including a pair of support bars secured to and including upwardly and inwardly between each comfort bar and said further horizontal bar thereabove, said support bars being perpendicular to the comfort bars and said further bars and in spaced and parallel relationship to one another and means cooperating between said support means and said anti-crushing bar normally maintaining said anti-crushing bar substantially horizontally but allowing same to pivot upwardly from the horizontal position.

2. The invention according to claim 1 in which said anti-crushing bar is substantially U-shaped when viewed in plan and includes a pair of end portions and a main portion extending between the inner ends thereof, said end portions being pivotally secured one each to one of said support bars but adjacent the outer ends thereof.

3. The invention according to claim 2 in which said means cooperating between said support means and said anti-crushing bar includes stops secured to said support bars intermediate the ends thereof engageable by said end portions of said anti-crushing bar when said anti-crushing bar is in the substantially horizontal position.

4. A pig farrowing crate which includes a horizontally situated lower comfort bar extending outwardly from each vertical side frame of said crate and a further horizontal bar in spaced and parallel relationship with each of said comfort bars but spaced inwardly therefrom and in the plane of said vertical side frame, an anti-crushing bar assembly for each side of said crate, said anti-crushing bar assembly each including support means on said crate and an inwardly extending anti-crushing bar pivotally secured by the ends thereof to said support means said support means including a pair of support bars secured to and extending upwardly and inwardly between each comfort bar and said further horizontal bar thereabove, said support bars being perpendicular to said comfort bars and said further bars and in spaced and parallel relationship to one another and means cooperating between said support means and said anti-crushing bar normally maintaining said anti-crushing bar substantially horizontally but allowing same to pivot upwardly from the horizontal.

5. The invention according to claim 4 in which each of said anti-crushing bars is substantially U-shaped when viewed in plan and include a pair of end portions and a main portion extending between the inner ends thereof, said end portions being pivotally secured one each to one of said support bars adjacent the outer ends of said end portions.

6. The invention according to claim 5 in which said means cooperating between said support means and said anti-crushing bar includes stops secured to said support bars intermediate the ends thereof engageable by said end portions of said anti-crushing bar.

* * * * *